United States Patent

[11] 3,586,951

| [72] | Inventors | Seiuemon Inaba<br>Kawasaki;<br>Kanryo Shimizu, Kawasaki; Yoshihiro<br>Hashimoto, Yokohama; Hiroshi Usami,<br>Kawasaki, all of, Japan |
|---|---|---|
| [21] | Appl. No. | 33,670 |
| [22] | Filed | May 1, 1970 |
| [45] | Patented | June 22, 1971 |
| [73] | Assignee | Fujitsu Limited<br>Kawasaki, Japan |
| [32] | Priority | May 14, 1969 |
| [33] | | Japan |
| [31] | | 44/37124 |

[54] NUMERICALLY CONTROLLED MACHINE SYSTEM DRIVEN BY ELECTROHYDRAULIC PULSE MOTOR
5 Claims, 3 Drawing Figs.

| [52] | U.S. Cl. | 318/632 |
|---|---|---|
| [51] | Int. Cl. | G05d 23/275 |
| [50] | Field of Search | 318/632 |

[56] References Cited
UNITED STATES PATENTS

| 3,348,435 | 10/1967 | Lauper | 318/632 X |
|---|---|---|---|
| 3,393,588 | 7/1968 | Broome | 318/632 X |
| 3,422,325 | 1/1969 | Gerber et al. | 318/632 X |

*Primary Examiner*—Benjamin Dobeck
*Attorneys*—Curt M. Avery, Arthur E. Wilfond, Herbert L. Lerner and Daniel J. Tick

ABSTRACT: An electric pulse motor has an input electrically connected to a source of control signals and an output mechanically coupled to the input of a differential mechanism. A compensating electric pulse motor has an output mechanically coupled to the input of the differential mechanism. A rotary pilot valve is mechanically coupled to the output of the differential mechanism. A compensating circuit has an input electrically connected to a machine which is mechanically coupled to the valve and an output electrically connected to the compensating electric pulse motor. The compensating circuit derives a compensating signal in accordance with an error in the machine and supplies the compensating signal to the compensating electric pulse motor to rotate the compensating electric pulse motor in accordance with the compensating signal.

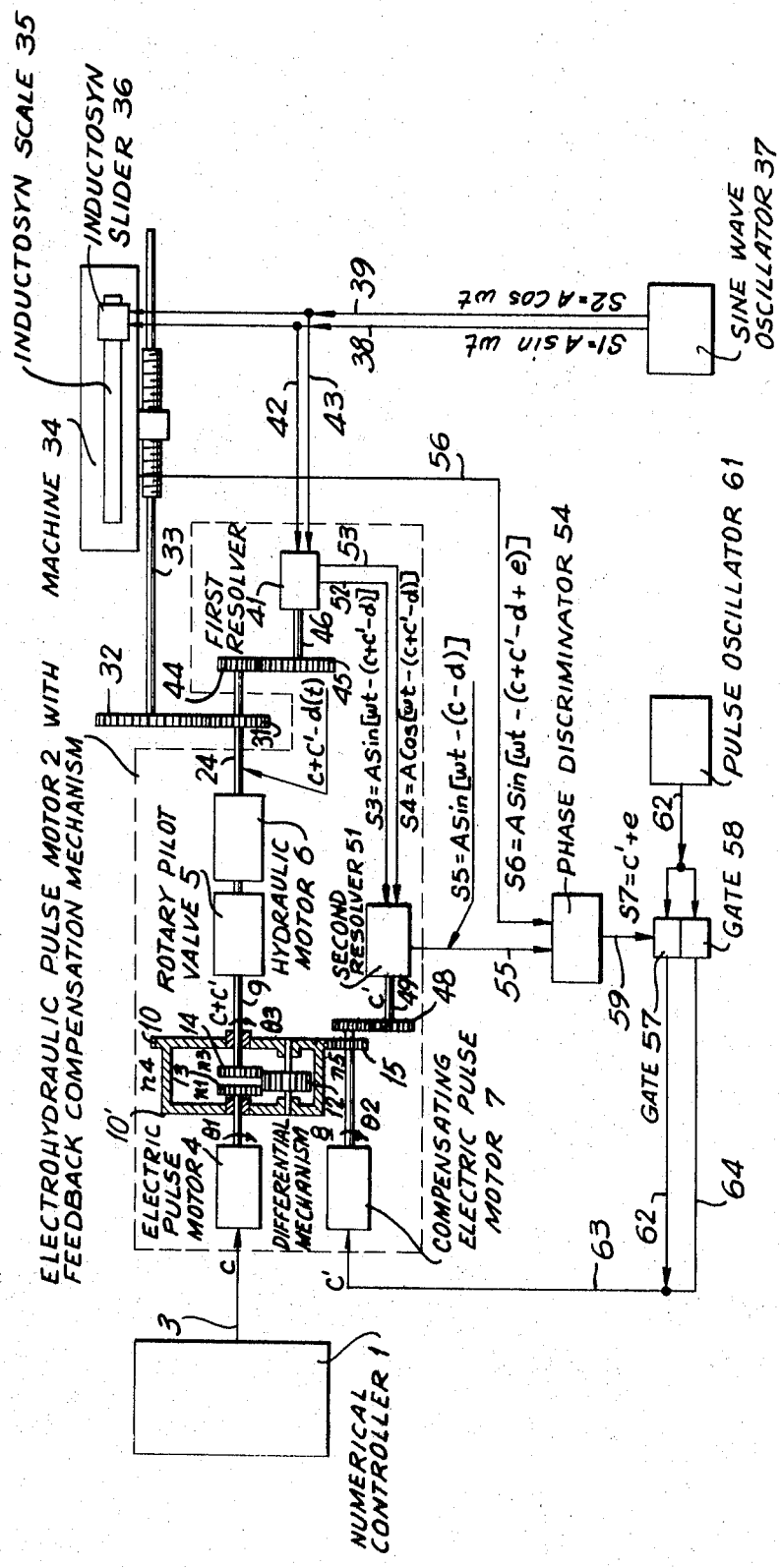

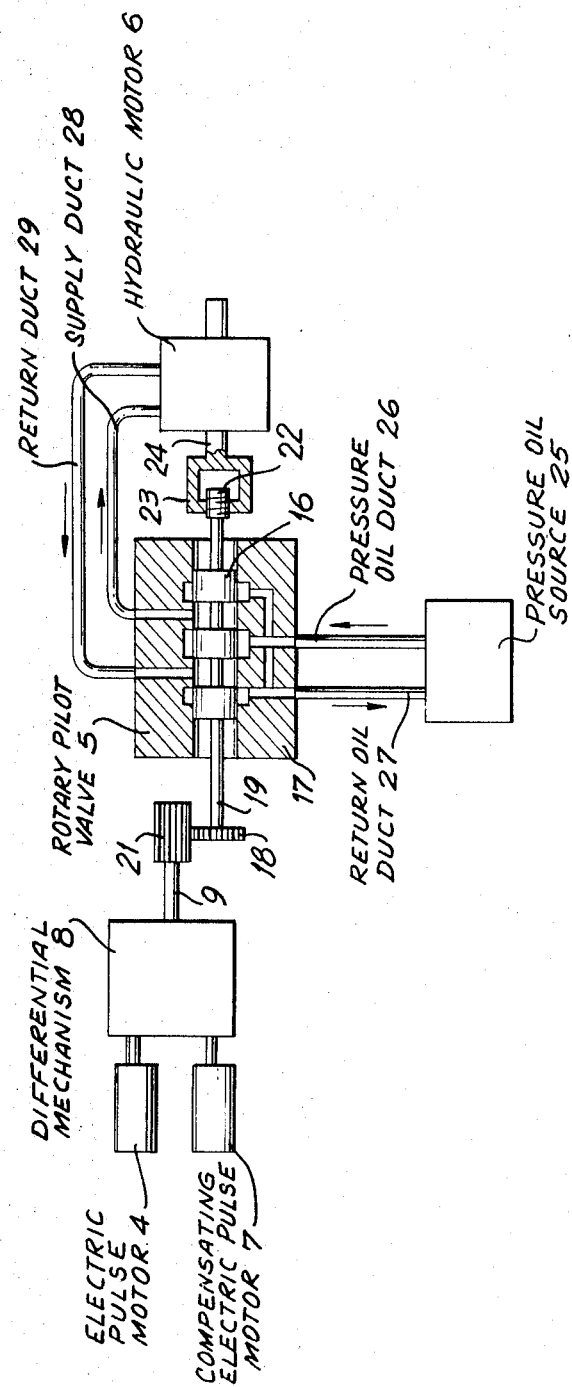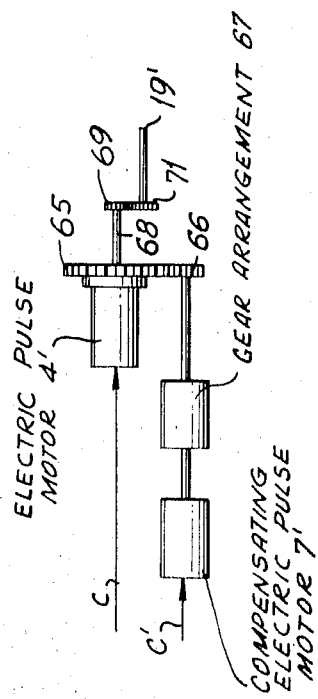

NUMERICALLY CONTROLLED MACHINE SYSTEM DRIVEN BY ELECTROHYDRAULIC PULSE MOTOR

Description of the Invention

The invention relates to a numerically controlled machine system. More particularly, the invention relates to a numerically controlled machine system driven by an electrohydraulic pulse motor.

A known type of numerically controlled machine in an open loop utilizes an electrohydraulic pulse motor as a driving motor. An error of the machine in a stage succeeding the pulse motor is detected and a compensating pulse is produced in accordance with such error. The compensating pulse is included in a command pulse train which is supplied to the electrohydraulic pulse motor. The known system has a defect, however, in that the numerical controller must be modified, since it is necessary to provide a circuit for adding pulses and a smoothing circuit in the numerical controller.

The principal object of the invention is to provide a new and improved numerically controlled machine.

An object of the invention is to provide a numerically controlled machine which compensates for errors therein with efficiency, effectiveness and reliability.

An object of the invention is to provide a numerically controlled machine which is of simple structure, but which eliminates the need for a pulse adding circuit or a smoothing circuit as in the krown system.

In accordance with the invention, a numerical controller supplies a command pulse train. An electrohydraulic pulse motor positions a machine in response to said command pulse train. The machine is in an open loop system. Errors in the machine are detected and are supplied to a rotary pilot valve of the electrohydraulic pulse motor via a differential mechanism to enable the machine to be positioned at the designated position.

In accordance with the invention, a numerically controlled machine system is driven by an electrohydraulic pulse motor. The machine system comprises a source of control signals. A differential mechanism has an input and an output. An electric pulse motor has an input electrically connected to the source of control signals and an output mechanically coupled to the input of the differential mechanism. The electric pulse motor is driven by control signals from the source of control signals. A compensating electric pulse motor has an input and an output mechanically coupled to the input of the differential mechanism. A rotary pilot valve is mechanically coupled to the output of the differential mechanism. A machine is mechanically coupled to the rotary pilot valve. A compensating circuit has an input electrically connected to the machine and an output electrically connected to the compensating electric pulse motor. The compensating circuit derives a compensating signal in accordance with an error in the machine and supplies the compensating signal to the compensating electric pulse motor to rotate the compensating electric pulse motor in accordance with the compensating signal.

An hydraulic motor is mechanically coupled between the output of the rotary pilot valve and the input of the machine.

An Inductosyn scale and a cooperating Inductosyn slider are provided on the machine.

The compensating circuit comprises a sine wave oscillator electrically connected to the Inductosyn slider, a first resolver having a rotor mechanically coupled to the hydraulic motor and a stator electrically connected to the sine wave oscillator. A second resolver has a stator electrically connected to the stator of the first resolver and a rotor mechanically coupled to the differential mechanism.

A coupling circuit electrically couples the second resolver to the compensating electric pulse motor. The coupling circuit of the compensating circuit comprises a phase discriminator having one input electrically connected to the stator of the second resolver and another input electrically connected to the Inductosyn scale and an output. Each of a pair of gates is operated by a different polarity signal connected to the output of the phase discriminator and to the compensating electric pulse motor. A pulse oscillator is connected to the gates in a manner whereby when the phase discriminator produces an output signal of one polarity it switches one of the gates to its conductive condition and the one of the gates transfers a pulse from the pulse oscillator to the compensating electric pulse motor. When the phase discriminator produces an output signal of the opposite polarity it switches the other of the gates to its conductive condition and the other of the gates transfers a pulse from the pulse oscillator to the compensating electric pulse motor.

The differential mechanism comprises a plurality of intercoupled gears. One of the gears is coupled to and rotates with the electric pulse motor. Another of the gears is coupled to and rotates with the compensating electric pulse motor. Another of the gears is coupled to and rotates the rotary pilot valve. Another of the gears is coupled to and rotates with the second resolver of the compensating circuit.

In order that the invention may be readily carried into effect, it will now be described with reference to the accompanying drawings, wherein:

FIG. 1 is a block diagram of an embodiment of the numerically controlled machine system of the invention;

FIG. 2 is a block diagram, one of the blocks of which is in section, of the electrohydraulic pulse motor of the embodiment of FIG. 1; and FIG. 3 is a schematic diagram of another embodiment of the electrohydraulic motor which may be utilized in the embodiment of FIG. 1.

In the FIGS. the same components are identified by the same reference numerals.

In FIG. 1, a numerical controller 1 provides a control or command signal to an electrohydraulic pulse motor 2 having a feedback compensation mechanism. The numerical controller 1 supplies the control signal in the form of a command or control pulse train to the electrohydraulic pulse motor 2 via a lead 3.

The electrohydraulic pulse motor 2, as do electrohydraulic pulse motors in general, comprises an electric pulse motor 4. The electrohydraulic pulse motor 2 also comprises a rotary pilot valve 5 and an hydraulic motor 6 having an input mechanically coupled to the output of said rotary pilot valve. In accordance with the invention, a compensating electric pulse motor 7 is included in the electrohydraulic pulse motor 2 in order to provide compensation, as hereinafter described.

The electric pulse motor 4 has an input electrically connected to the output of the numerical controller 1 and an output or rotor coupled to an input of a differential mechanism 8. The compensating electric pulse motor 7 has an electrical input and an output or rotor coupled to an input mechanism 8. An output of the differential mechanism 8 is mechanically coupled to the input of the rotary pilot valve 5 via an output shaft 9 of said differential mechanism.

The differential mechanism 8 comprises a gear 10, a housing 10' rotated with said gear, a shaft 11 rotatably mounted in said housing, and a gear 12 mounted on said shaft. A gear 13 is mounted on the output shaft of the electric pulse motor 4. A gear 14 is mounted in the input shaft of the rotary pilot valve 5 and has a diameter equal to that of the gear 13.

The gear 13 has a different number of teeth from those of the gear 14. Both gears 13 and 14 engage the gear 12. Thus, if the compensating electric pulse motor 7 is stopped, and the electric pulse motor 4 is rotated, the rotary pilot valve 5 may be rotated in accordance with the difference between the number of teeth of the gear 13 and the number of teeth of the gear 14. If the electric pulse motor 4 is stopped, and the compensating electric pulse motor 7 is rotated, the rotary pilot valve 5 may be rotated by a magnitude including the reduction ratios of the gear 10 and a gear 15, coupled thereto.

When the angle of rotation of the electric pulse motor 4 is $\theta_1$, the angle of rotation of the compensating electric pulse motor 7 is $\theta_2$, the angle of rotation of the output shaft 9 of the differential mechanism 8 is $\theta 3$, the number of teeth of the gear 13 is $n1$, the number of teeth of the gear 12 is $n2$, the number of teeth of the gear 14 is $n3$, the number of teeth of the gear 10 is $n4$, and the number of teeth of the gear 15 is $n5$, such magnitudes are mutually related in the following equation $$\theta 3 = \theta 1 \frac{n1}{n3} + \theta 2 \frac{n5}{n4}\left(1 - \frac{n1}{n3}\right)$$

FIG. 2 shows an electrohydraulic pulse motor comprising the electric pulse motor 4, the compensating electric pulse motor 7, the differential mechanism 8, the rotary pilot valve 5 and the hydraulic motor 6. The details of the rotary pilot valve 5 are shown in FIG. 2. The rotary pilot valve 5 comprises a rotary spool 16 and a fixed sleeve 17. A gear 18 is mounted on and rotates with the shaft 19 of the spool 16. The gear 18 is coupled with a gear 21 which is affixed to and rotates with the output shaft 9 of the differential mechanism 8. An externally threaded member 22 is mounted on and rotates with the other end of the shaft 19 of the spool 16. The externally threaded member 22 is coupled with an internally threaded member or nut 23 mounted on and rotating with the output shaft 24 of the hydraulic motor 6. A pressure oil source 25 is coupled to the rotary pilot valve 5 via a pressure oil duct 26 and a return oil duct 27. The hydraulic motor 6 is coupled to the rotary pilot valve 5 via a supply duct 28 and a return duct 29.

If the output shaft 9 of the differential mechanism 8 is rotated through a specific angle, the spool 16 of the rotary pilot valve 5 is rotated through a specific angle and is simultaneously moved in an axial direction such as, for example, to the left in FIG. 2. Consequently, oil under pressure is supplied to the hydraulic motor 6 via the supply duct 28 and causes said hydraulic motor to rotate its shaft 24. The oil is returned from the hydraulic motor 6 to the rotary pilot valve 5 via the return duct 29 and is returned to the pressure oil source 25 via the return oil duct 27. When the shaft 24 of the hydraulic motor 6 has rotated through an angle equal to the angle of rotation of the spool 16 of the rotary pilot valve 5, said spool is returned to its initial position and the rotation of said hydraulic motor is stopped.

In FIG. 1, the output shaft 24 of the hydraulic motor 6, which is also the output shaft of the electrohydraulic pulse motor 2, rotates a gear 31 affixed to said shaft and rotating therewith. The gear 31 is coupled to a gear 32 which is mounted on and rotates with a feed screw 33 of a machine 34. The feed screw 33 positions the machine 34 by rotating. The machine 34 includes a detector which comprises an Inductosyn scale 35 and an Inductosyn slider 36 which is slidably mounted on said Inductosyn scale.

A sine wave oscillator 37 is electrically connected to the Inductosyn slider 36 via electrical conductors 38 and 39. The sine wave oscillator 37 is electrically connected to the input or stator of a first resolver 41 via the electrical conductors 38 and 39 and electrical conductors 42 and 43. The sine wave oscillator 37 supplies reference waves $$S1 = A \sin\omega t$$

and $$S2 = A \cos\omega t$$

to the Inductosyn slider 36 and to the stator winding of the first resolver 41.

A gear 44 is coupled to and rotates with the output shaft 24 of the electrohydraulic pulse motor 2. The gear 44 is coupled to a gear 45 which is affixed to and rotates with the rotor shaft 46 of the first resolver 41. The rotor of the first resolver 41 is thus rotated by the electrohydraulic pulse motor 2.

A gear 47 is affixed to and rotates with the output shaft of the compensating electric pulse motor 7. The gear 47 is coupled to a gear 48 which is mounted on and rotates with the rotor shaft 49 of a second resolver 51. The second resolver 51 is therefore rotated by the compensating electric pulse motor 7.

The stator of the first resolver 41 is electrically connected to the stator of the second resolver 51 via leads 52 and 53. The first resolver 41 supplies an output $$S3 = A \sin[\omega t - (c + c' - d)]$$

to the second resolver 51 via the lead 52. The first resolver 41 supplies an output $$S4 = A \cos[\omega t - (c + c' - d)]$$

to the second resolver 51 via the lead 53.

A phase discriminator 54 has an input electrically connected to the stator of the second resolver 51 via an electrical conductor 55 and an input electrically connected to the Inductosyn scale 35 via an electrical conductor 56. The second resolver 51 supplies an output $$S5 = A \sin[\omega t - (c - d)]$$

to one input of the phase discriminator 54 and the Inductosyn scale 35 supplies an output $$S6 = A \sin[\omega t - (c + c' - d + e)]$$

to the other input of said phase discriminator.

The phase discriminator 54 has an output connected to a pair of gates 57 and 58 via an electrical conductor 59. The phase discriminator 54 supplies a waveform $$S7 = c' + e$$

in its output lead. The gate 57 is switched to its conductive condition by a positive polarity signal and the gate 58 is switched to its conductive condition via a negative polarity signal. A pulse oscillator 61 is electrically connected in common to the input of both gates 57 and 58 via an electrical conductor 62. The gate 57 has an output electrically connected to the input of the compensating electric pulse motor 7 via the electrical conductor 62 and an electrical conductor 63. The gate 58 has an output electrically connected to the input of the compensating electric pulse motor 7 via an electrical conductor 64 and the electrical conductor 63.

The phase discriminator 54 switches to its conductive condition either the gate 57 or the gate 58 in accordance with the phase difference between the waveforms S5 and S6 supplied to its inputs by the second resolver 51 and the Inductosyn scale 35, respectively. When the gate 57 is switched to its conductive condition, it transfers a pulse from the pulse oscillator 61 to the compensating electric pulse motor 7. When the gate 58 is switched to its conductive condition, it transfers a pulse from the pulse oscillator 61 to the compensating electric pulse motor 7.

In the waveforms S3, S4, S5, S6 and S7, $c$ is the command or control magnitude or value, $c'$ *is the compensating magnitude or value*, $d$ is the delay of the electrohydraulic pulse motor 2 and $e$ is the error of the machine system. It may be assumed that the control magnitude $c$ is supplied from the numerical controller 1 to the electric pulse motor 4 and the compensating magnitude $c'$ is supplied from the compensating circuit to the compensating electric pulse motor 7. The differential mechanism 8 adds the control magnitude $c$ and the compensating magnitude $c'$ and the output shaft 9 of said differential mechanism is rotated by $c + c'$.

Due to the delay in the electrohydraulic pulse motor 2, the output shaft 24 of said electrohydraulic pulse motor is rotated by $$c + c' - d(t)$$

and drives the machine 34. An error is included in the apparatus for feeding the machine 34, so that signals equivalent to $$c + c' - d + e$$

may be provided at the Inductosyn scale 35.

The waveforms or signals $$S3 = A \sin[\omega t - (c + c' - d)]$$

and $$S4 = A \cos[[\omega t - (c + c' - d)]$$

are supplied to the stator of the second resolver 51 and the rotor of said second resolver is rotated by $c'$. The second resolver 51 therefore produces an output waveform or signal $$S5 = A \sin[\omega t - (c - d)]$$

Since the Inductosyn scale 35 produces an output $$S6 = A \sin[\omega t - (c + c' - d + e)]$$

the phase discriminator 54 always detects the signal or waveform $$S7 = c' + e$$

The phase discriminator 54 switches the positive gate 57 to its conductive condition or switches the negative gate 58 to its conductive condition in accordance with the polarity of the waveform or signal S7 and switches said gates to their nonconductive condition when said signal decreases to less than a specific magnitude or zero. Thus, a compensating magnitude equal to an error $e$ is always supplied to the compensating electric pulse motor 7.

Although the compensating electric pulse motor 7 in the embodiment of FIG. 1 is an electric pulse motor, an ordinary servo motor may be utilized. Furthermore, the rotary pilot valve 5 may comprise any suitable known valve.

FIG. 3 illustrates another embodiment of the differential mechanism and electric pulse motors of the invention. A gear 65 is mounted on the outer circumference of the electric pulse motor 4'. The control magnitude $c$ is supplied to the electric pulse motor 4'. A gear 66 is coupled to the compensating electric pulse motor 7' via a gear arrangement 67. The gears 65 and 66 are coupled to each other.

In the embodiment of FIG. 3, the electric pulse motor 4' has an output or rotor shaft 68. A gear 69 is affixed to and rotates with the rotor shaft 68 of the electric pulse motor 4'. A gear 71, coupled to the gear 69, is affixed to and rotates the spool shaft 19' of the rotary pilot valve (not shown in FIG. 3).

As hereinbefore described, in accordance with our invention, a numerically controlled machine system is provided by the utilization of a simple differential mechanism and is capable of compensating for errors and requires no additional circuitry.

While the invention has been described by means of specific examples and in specific embodiments, we do not wish to be limited thereto, for obvious modifications will occur to those skilled in the art without departing from the spirit and scope of the invention.

We claim:

1. A numerically controlled machine system driven by an electrohydraulic pulse motor, said machine system comprising:
   a source of control signals;
   a differential mechanism having an input and an output;
   an electric pulse motor having an input electrically connected to said source of control signals and an output mechanically coupled to the input of said differential mechanism, said electric pulse motor being driven by control signals from said source of control signals;
   a compensating electric pulse motor having an input and an output mechanically coupled to the input of said differential mechanism;
   a rotary pilot valve mechanically coupled to the output of said differential mechanism;
   a machine mechanically coupled to said rotary pilot valve; and
   compensating means having an input electrically connected to said machine and an output electrically connected to said compensating electric pulse motor for deriving a compensating signal in accordance with an error in said machine and supplying said compensating signal to said compensating electric pulse motor to rotate said compensating electric pulse motor in accordance with said compensating signal.

2. A numerically controlled machine system as claimed in claim 1, further comprising an hydraulic motor mechanically coupled between the output of said rotary pilot valve and the input of said machine.

3. A numerically controlled machine system as claimed in claim 2, further comprising an Inductosyn scale and a cooperating Inductosyn slider on said machine, and wherein said compensating means comprises a sine wave oscillator electrically connected to said Inductosyn slider, a first resolver having a rotor mechanically coupled to said hydraulic motor and a stator electrically connected to said sine wave oscillator, a second resolver having a stator electrically connected to the stator of said first resolver and a rotor mechanically coupled to said differential mechanism and coupling means electrically coupling said second resolver to said compensating electric pulse motor.

4. A numerically controlled machine system as claimed in claim 3, wherein the coupling means of said compensating means comprises a phase discriminator having one input electrically connected to the stator of said second resolver and another input electrically connected to said Inductosyn scale and an output, a pair of gates each operated by a different polarity signal connected to the output of said phase discriminator and to said compensating electric pulse motor, and a pulse oscillator connected to said gates in a manner whereby when said phase discriminator produces an output signal of one polarity it switches one of said gates to its conductive condition and said one of said gates transfers a pulse from said pulse oscillator to said compensating electric pulse motor and when said phase discriminator produces an output signal of the opposite polarity it switches the other of said gates to its conductive condition and said other of said gates transfers a pulse from said pulse oscillator to said compensating electric pulse motor.

5. A numerically controlled machine system as claimed in claim 5, wherein said differential mechanism comprises a plurality of intercoupled gears, one of said gears being coupled to and rotating with said electric pulse motor, another of said gears being coupled to and rotating with said compensating electric pulse motor, another of said gears being coupled to and rotating said rotary pilot valve and another of said gears being coupled to and rotating with the second resolver of said compensating means.